United States Patent
Chui et al.

(10) Patent No.: US 8,040,338 B2
(45) Date of Patent: Oct. 18, 2011

(54) METHOD OF MAKING PASSIVE CIRCUITS FOR DE-MULTIPLEXING DISPLAY INPUTS

(75) Inventors: Clarence Chui, San Jose, CA (US); Alan Lewis, Sunnyvale, CA (US); Marc M. Mignard, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/855,487

(22) Filed: Aug. 12, 2010

(65) Prior Publication Data

US 2010/0321352 A1 Dec. 23, 2010

Related U.S. Application Data

(62) Division of application No. 11/479,865, filed on Jun. 29, 2006, now Pat. No. 7,777,715.

(51) Int. Cl.
*G06F 3/038* (2006.01)
*G09G 3/00* (2006.01)
*G09G 3/34* (2006.01)
*G02B 26/02* (2006.01)
*H01L 21/82* (2006.01)
*H01L 21/20* (2006.01)

(52) U.S. Cl. .......... 345/208; 345/31; 345/108; 359/230; 438/128; 438/381

(58) Field of Classification Search .................. 345/31, 345/85, 94–96, 100, 103, 108–111, 208–210; 359/223.1, 230, 247, 290–292, 578; 438/128, 438/129, 381, 382
See application file for complete search history.

(56) References Cited

U.S. PATENT DOCUMENTS

| 4,050,064 | A | * | 9/1977 | Hashimoto et al. ............ 345/52 |
| 4,709,995 | A |   | 12/1987 | Kuribayashi et al. |
| 4,954,789 | A |   | 9/1990 | Sampsell |
| 4,982,184 | A |   | 1/1991 | Kirkwood |
| 5,068,649 | A |   | 11/1991 | Garrett |
| 5,280,277 | A |   | 1/1994 | Hornbeck |
| 5,475,397 | A |   | 12/1995 | Saidi |
| 5,548,301 | A |   | 8/1996 | Kornher et al. |

(Continued)

FOREIGN PATENT DOCUMENTS

EP  0 467 048  1/1992

(Continued)

OTHER PUBLICATIONS

Lieberman et al., 1997, Efficient model based halftoning using direct binary search, IEEE, pp. 775-778.

(Continued)

*Primary Examiner* — Bipin Shalwala
*Assistant Examiner* — Keith Crawley
(74) *Attorney, Agent, or Firm* — Knobbe Martens Olson & Bear LLP

(57) ABSTRACT

A display array which can reduce the row connections between the display and the driver circuit and methods of manufacturing and operating the same are disclosed. In one embodiment, a display device comprises an array of MEMS display elements and a plurality of voltage dividers coupled to the array and configured to provide row output voltages to drive the array, wherein each row is connected to at least two inputs joined by a voltage divider.

19 Claims, 15 Drawing Sheets

U.S. PATENT DOCUMENTS

| | | | |
|---|---|---|---|
| 5,589,852 A | 12/1996 | Thompson et al. | |
| 5,784,189 A | 7/1998 | Bozler et al. | |
| 5,790,548 A | 8/1998 | Sistanizadeh et al. | |
| 6,040,937 A | 3/2000 | Miles | |
| 6,232,936 B1 | 5/2001 | Gove et al. | |
| 6,429,601 B1 | 8/2002 | Friend et al. | |
| 6,480,177 B2 | 11/2002 | Doherty et al. | |
| 6,574,033 B1 | 6/2003 | Chui et al. | |
| 6,633,306 B1 | 10/2003 | Marz et al. | |
| 6,636,187 B2 | 10/2003 | Tajima et al. | |
| 6,674,562 B1 | 1/2004 | Miles | |
| 6,680,792 B2 | 1/2004 | Miles | |
| 6,697,075 B1 * | 2/2004 | Paterson | 345/567 |
| 6,741,384 B1 | 5/2004 | Martin et al. | |
| 7,123,216 B1 | 10/2006 | Miles | |
| 7,142,346 B2 | 11/2006 | Chui et al. | |
| 7,161,728 B2 | 1/2007 | Sampsell et al. | |
| 7,242,512 B2 | 7/2007 | Chui et al. | |
| 7,327,510 B2 | 2/2008 | Cummings et al. | |
| 7,388,697 B2 | 6/2008 | Chui et al. | |
| 7,489,428 B2 | 2/2009 | Sampsell et al. | |
| 7,545,554 B2 | 6/2009 | Chui et al. | |
| 7,777,715 B2 | 8/2010 | Chui et al. | |
| 7,782,525 B2 | 8/2010 | Sampsell et al. | |
| 2004/0021658 A1 | 2/2004 | Chen | |
| 2005/0122560 A1 * | 6/2005 | Sampsell et al. | 359/290 |
| 2005/0174356 A1 | 8/2005 | Paterson | |
| 2005/0185003 A1 | 8/2005 | Dedene et al. | |
| 2006/0114542 A1 | 6/2006 | Bloom | |
| 2006/0119613 A1 | 6/2006 | Kerofsky | |
| 2007/0086078 A1 | 4/2007 | Hagood et al. | |
| 2009/0213449 A1 | 8/2009 | Chui et al. | |
| 2011/0075247 A1 | 3/2011 | Chui et al. | |

FOREIGN PATENT DOCUMENTS

| | | |
|---|---|---|
| EP | 1 258 860 | 11/2002 |
| EP | 1 640 960 | 3/2006 |
| JP | 2002 062493 | 2/2002 |
| KR | 2003 0030470 | 4/2003 |
| WO | WO 03/044765 | 5/2003 |
| WO | WO 2005/062284 | 7/2005 |
| WO | WO 2005/078693 | 8/2005 |

OTHER PUBLICATIONS

Office Action dated Nov. 9, 2010 in Chinese App. No. 200780024679.6.

Miles, MEMS-based interferometric modulator for display applications, Part of the SPIE Conference on Micromachined Devices and Components, 3876:20-28 (1999).

Miles et al., 2000, 5.3: Digital Paper™: Reflective displays using interferometric modulation, SID Digest, vol. XXXI, pp. 32-35.

ISR and WO for PCT/US07/011811, filed May 16, 2007.

IPRP for PCT/US07/011811, filed May 16, 2007.

Office Action dated Aug. 31, 2009 in U.S. App. No. 11/479,865.

Office Action dated Jan. 15, 2010 in U.S. App. No. 11/479,865.

Office Action dated Jun. 2, 2010 in Chinese App. No. 200780024679.6.

Official Communication dated Sep. 21, 2010 in European App. No. 07794970.9.

* cited by examiner

Input

| Location | Applied Voltage |
|---|---|
| $V_{m1}$ | 5 |
| $V_{m2}$ | -1.5 |
| $V_{L1}$ | 5 |
| $V_{L2}$ | -1.5 |
| $V_{L3}$ | -1.5 |

Output

| Location | Resulting Voltage |
|---|---|
| $V_1$ | 5 |
| $V_2, V_3$ | 1.75 |
| $V_4$ | 1.75 |
| $V_5, V_6$ | -1.5 |

FIG. 10

|  | Column Output Signals | |
|---|---|---|
|  | +5 | -5 |
| Row Output Signals From Demultiplexer +5 | Relax | Actuate |
| +1.75 | Stable | Stable |
| -1.5 | Stable | Stable |

FIG. 11

Example (R1=6Kohms; R2=10Kohms; R3=9Kohms; R4=8.5Kohms)

Input

| Location | Applied Voltage |
|---|---|
| $V_{m1}$ | 13.5 |
| $V_{m2}$ | 1.5 |
| $V_{L1}$ | 9.5 |
| $V_{L4}$ | -0.5 |
| $V_{L2}, V_{L3}$ | -2.5 |
| $V_{L5}, V_{L6}$ | -2.5 |

Output

| Location | Resulting Voltage |
|---|---|
| $V_1$ | 5 |
| $V_2, V_3$ | 1.75 |
| $V_4$ | 1.75 |
| $V_5, V_6$ | -1.75 |

FIG. 14

METHOD OF MAKING PASSIVE CIRCUITS FOR DE-MULTIPLEXING DISPLAY INPUTS

CROSS-REFERENCE TO RELATED APPLICATIONS

This application is a divisional of U.S. patent application Ser. No. 11/479,865, filed on Jun. 29, 2006 and entitled Passive Circuits for De-multiplexing Display Inputs, now U.S. Pat. No. 7,777,715. The entire disclosure of this application is hereby incorporated by reference.

BACKGROUND OF THE INVENTION

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical voltage. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display device comprises an array of microelectromechanical system (MEMS) display elements, and a plurality of passive impedance network circuits coupled to said array and configured to provide row output voltages to drive said array, each passive impedance network comprising at least two inputs and at least one output to a row of display elements, wherein said row output is controlled by said inputs.

In another embodiment, a display device comprises an array of microelectromechanical system (MEMS) display elements formed as a set of intersecting rows and columns, a row input lead for each row, a first voltage input connected through a first series impedance to a first row input lead, and a second voltage input connected through a second series impedance to said first row input lead.

In another embodiment, a display device comprises means for displaying image data and means for demultiplexing one or more row driving voltages and providing demultiplexed voltages to said displaying means.

In another embodiment, a method of making a display device comprises forming an array of microelectromechanical system (MEMS) display elements on a substrate, and forming a plurality of passive impedance network circuits on the same or a different substrate, each comprising at least two inputs and an output, wherein at least some of said passive impedance network circuits are coupled to said array.

In another embodiment, a method of demultiplexing a row driving voltage in a row by row addressing scheme of a display device comprises applying said row driving voltage of a selected voltage to a plurality of rows through a set of series impedances, applying a first control voltage to a first one of said plurality of rows through a first series impedance, and applying a second control voltage to a second one of said plurality of rows through a second series impedance.

In another embodiment, a display device comprises an array of microelectromechanical system (MEMS) display elements formed as a set of intersecting rows and columns, a row input lead for each row, and a first voltage input connected through a first series impedance to a first row input lead and connected through a second series impedance to a second row input lead.

In another embodiment, a display device comprises an array of microelectromechanical system (MEMS) display elements formed as a set of intersecting rows and columns and having N row inputs to said array, a display driver circuit having n row driver outputs, wherein n is less than N, and a passive impedance network having said n row driver outputs as inputs, and having N row driver outputs that are coupled to said N row inputs to said array.

BRIEF DESCRIPTION OF THE DRAWINGS

FIG. 10 illustrates a set of output voltages of the demultiplexer embodiment shown in FIG. 9 when an exemplary set of row driving input voltages and control voltages are applied.

FIG. 11 illustrates an exemplary set of column and row voltage levels that may be used for pixels exhibiting the hysteresis curves of FIG. 3.

FIG. 14 illustrates a set of output voltages of the demultiplexer embodiment shown in FIG. 13.

DETAILED DESCRIPTION OF THE CERTAIN EMBODIMENTS OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

For certain embodiments of a display device, it is desirable to reduce the number of row connections required between the display and the driver circuit. For example, in a display device incorporated in mobile applications, the display driver can be a significant fraction of the overall display module cost. The cost is often directly related to the number of connections required between the driver circuit and the display. Reducing the number of row connections required between the display array and the driver circuit is preferred because it leads to lower electronics cost. In one embodiment of the invention, a plurality of voltage dividers are integrated with a display array which can reduce the number of row connections required between a driver circuit and the display array. Each row of the display array is connected through a voltage divider to a row driving voltage and a control voltage from the driver circuit. Each row driving voltage is connected to a set of rows through voltage dividers. By modulating the control voltage connected to each row within the set of rows, only one row is updated at one time.

Figure 1:
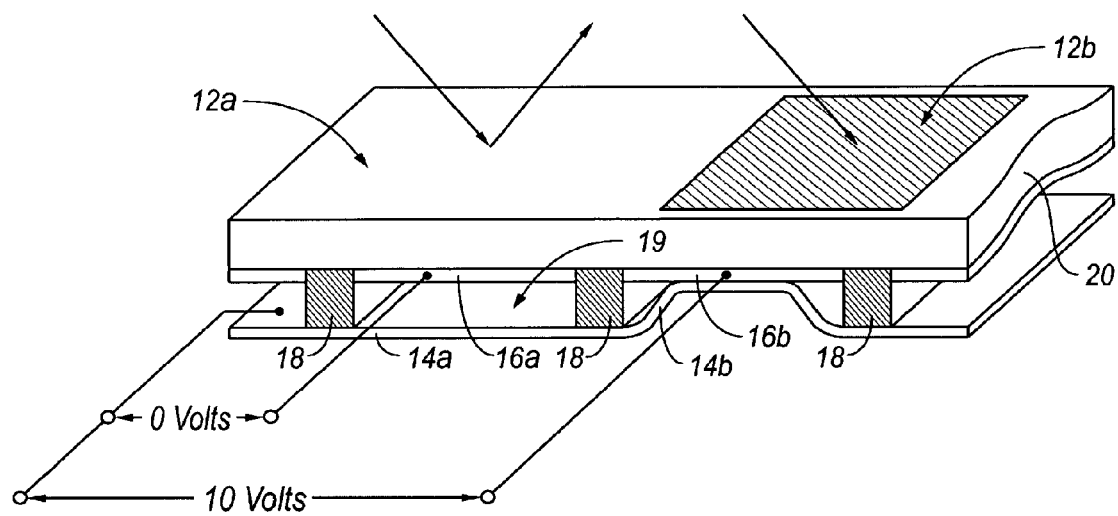
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
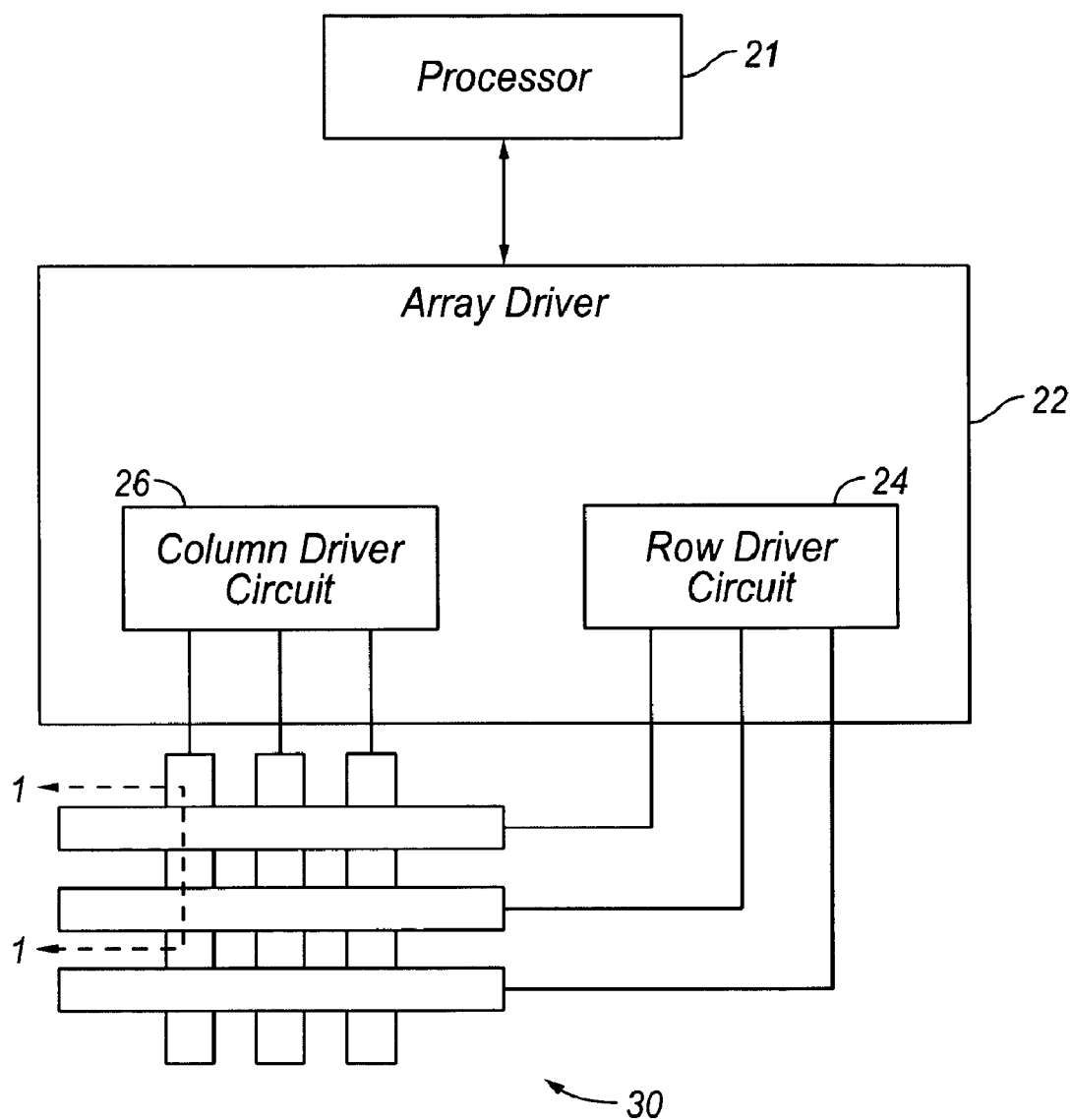
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital voltage processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide voltages to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the Row 1 electrode, actuating the pixels corresponding to the asserted column lines. The asserted set of column electrodes is then changed to correspond to the desired set of actuated pixels in the second row. A pulse is then applied to the Row 2 electrode, actuating the appropriate pixels in Row 2 in accordance with the asserted column electrodes. The Row 1 pixels are unaffected by the Row 2 pulse, and remain in the state they were set to during the Row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
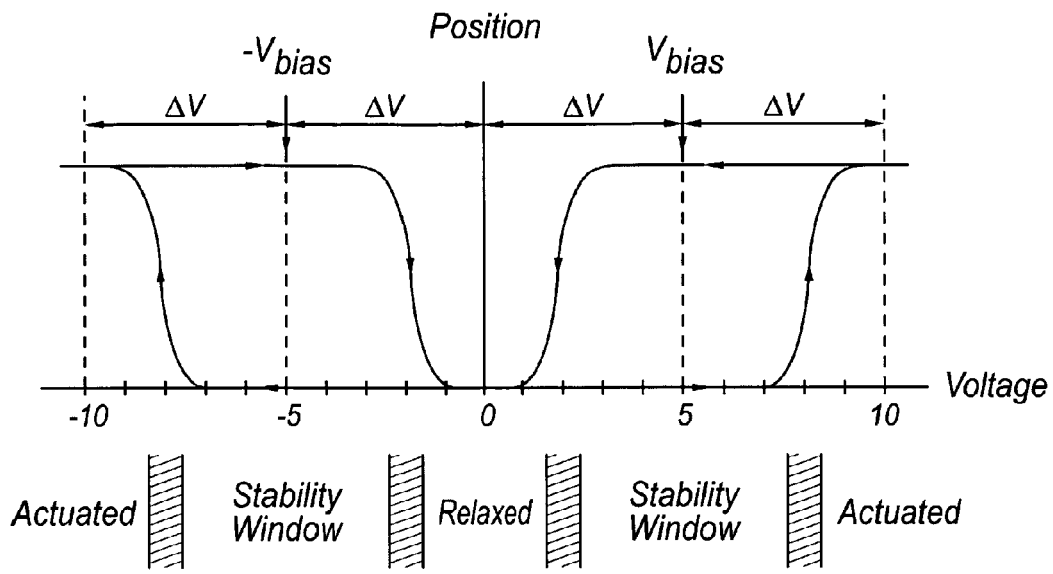
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
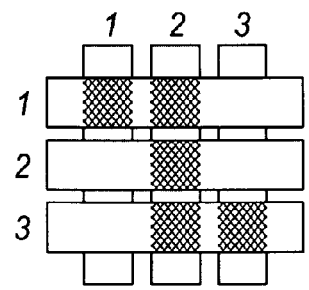
FIG. 5A illustrates one exemplary frame of display data in the 3×3 interferometric modulator display of FIG. 2.
Figure 5B:
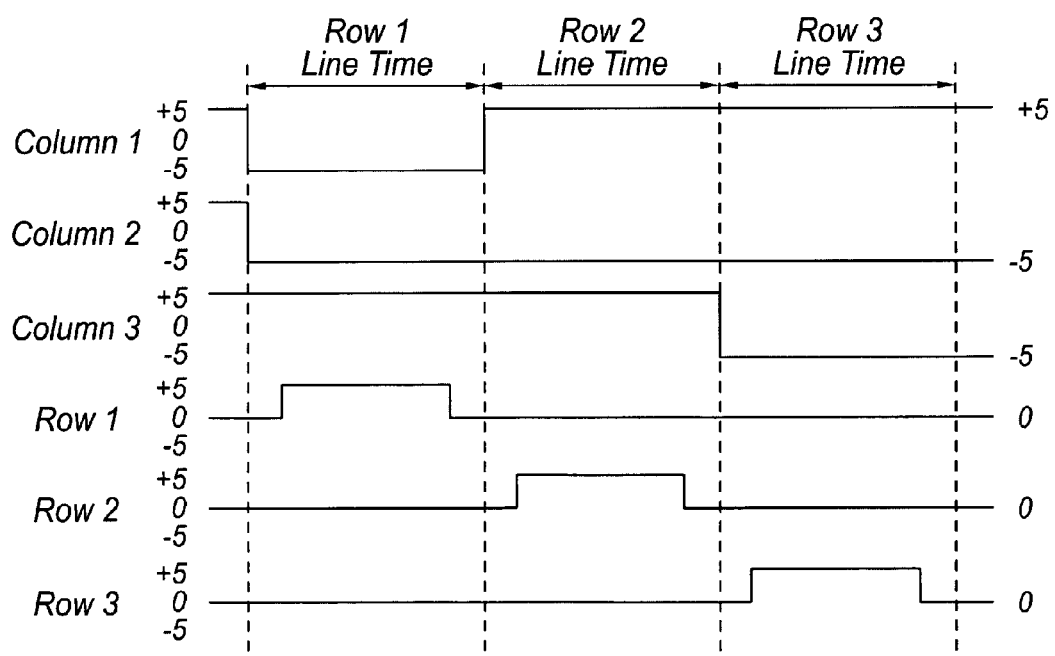
FIG. 5B illustrates one exemplary timing diagram for row and column voltages that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column voltages applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for Row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set Row 2 as desired, column 2 is set to −5 volts, and columns 1 and 3 are set to +5 volts. The same strobe applied to Row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The Row 3 strobe sets the Row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
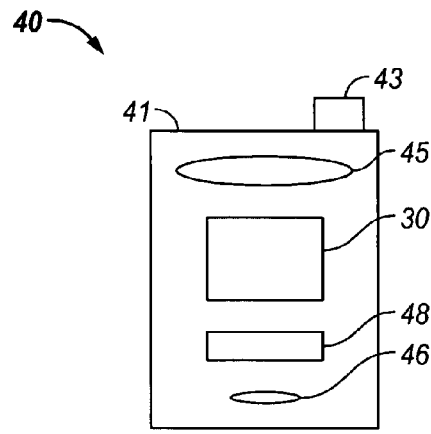
FIGS. 6A and 6B are system block diagrams illustrating an embodiment of a visual display device comprising a plurality of interferometric modulators.
Figure 6B:
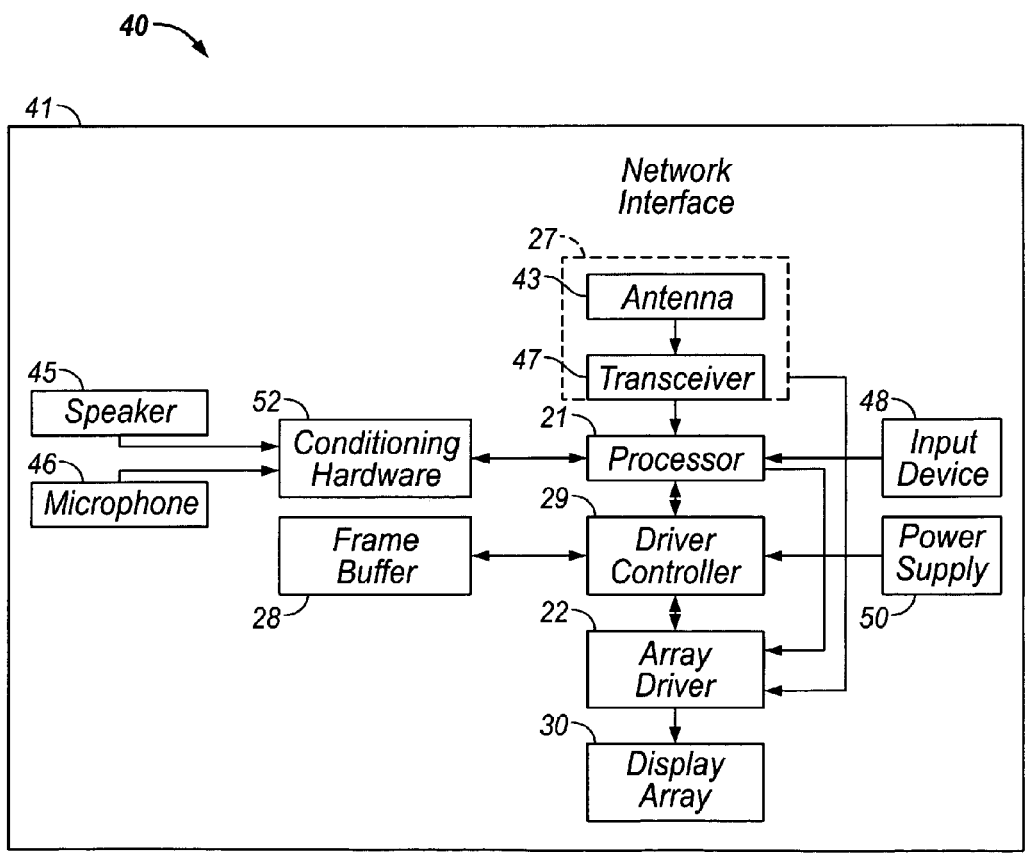

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a voltage (e.g. filter a voltage). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving voltages. In one embodiment, the antenna transmits and receives RF voltages according to the IEEE 802.11 standard, including IEEE 802.11 (a), (b), or (g). In another embodiment, the antenna transmits and receives RF voltages according to the BLUETOOTH standard. In the case of a cellular telephone, the antenna is designed to receive CDMA, GSM, AMPS or other known voltages that are used to communicate within a wireless cell phone network. The transceiver 47 pre-processes the voltages received from the antenna 43 so that they may be received by and further manipulated by the processor 21. The transceiver 47 also processes voltages received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting voltages to the speaker 45, and for receiving voltages from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
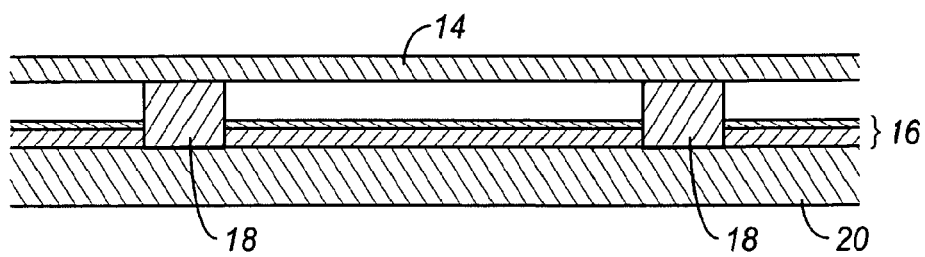
FIG. 7A is a cross section of the device of FIG. 1.
Figure 7B:
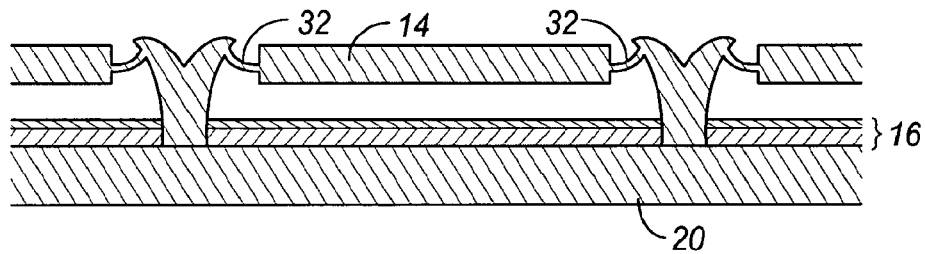
FIG. 7B is a cross section of an alternative embodiment of an interferometric modulator.
Figure 7C:
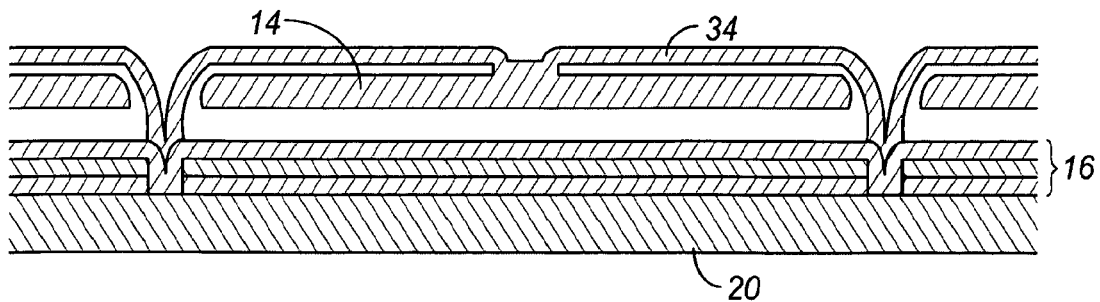
FIG. 7C is a cross section of another alternative embodiment of an interferometric modulator.
Figure 7D:
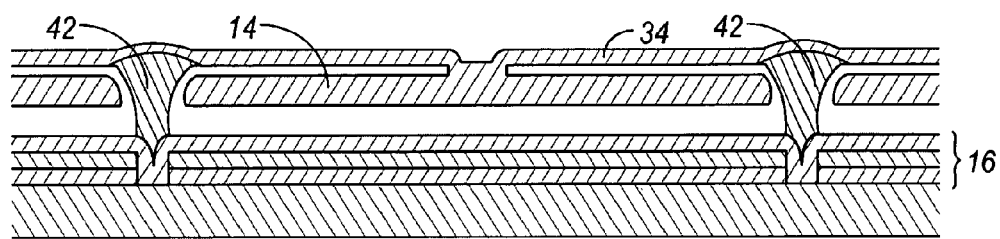
FIG. 7D is a cross section of yet another alternative embodiment of an interferometric modulator.
Figure 7E:
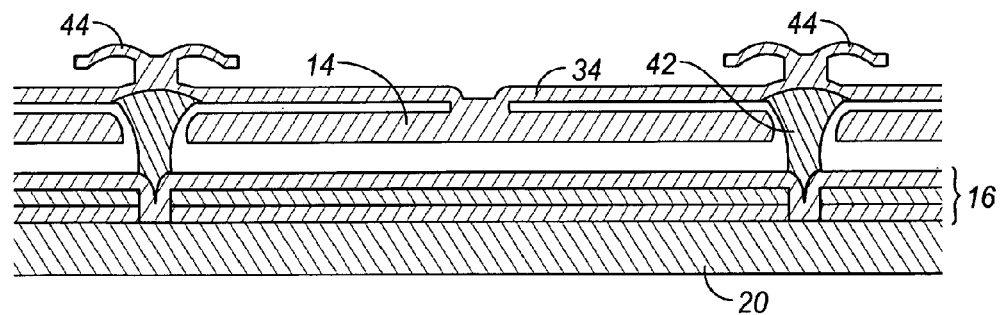
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows voltage routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above, the interferometric modulator is driven by the difference between the row and column voltages. It will be appreciated that the terms "columns" and "rows" are geometrically arbitrary in the sense that either can be oriented in the vertical or horizontal direction. In this disclosure, the "columns" will be considered the set of display inputs receiving voltages that are image data dependent. The "rows" will be considered to be the set of display inputs receiving voltages that do not vary with the image data, such as the sequential row strobe input voltages described above.

For certain embodiments of a display device, it is desirable to reduce the number of row connections required between the display and the driver circuit. For example, a display with color pixels may have three times as many columns and four times as many rows as a black and white display with the same number of pixels. In these color embodiments, each pixel may comprise four red, four blue, and four green modulators. The reflective states of the set of 12 "sub-pixels" determine the perceived color of the pixel as a whole. As a result, four times as many row driver outputs would normally be necessary. It is then preferable to drive such a display with a driver circuit that has fewer row driving lines. In certain embodiments of a display device incorporated in mobile applications, the display driver can be a significant fraction of the overall display module cost. The cost is often directly related to the number of connections required between the driver circuit and the display. Reducing the number of row connections required between the display array and the driver circuit is preferred because it leads to lower electronics cost.

Figure 8:
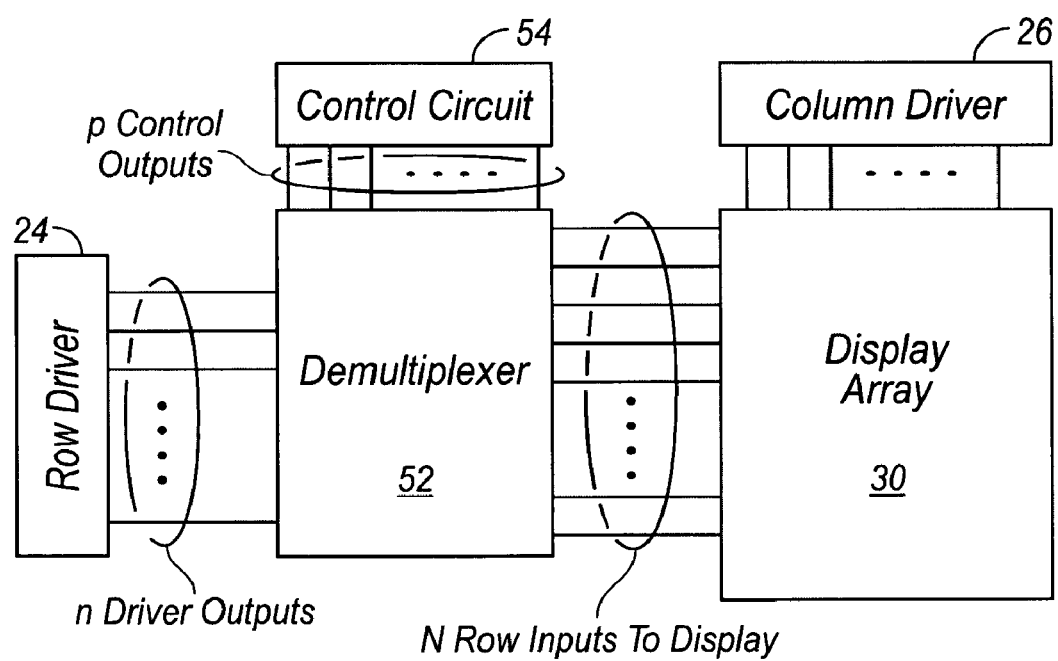
FIG. 8 is a system block diagram illustrating one embodiment of an electronic device incorporating a display array and a demultiplexer which reduces the row input lines to the display.

FIG. 8 is a system block diagram illustrating one embodiment of an electronic device incorporating a display array and a demultiplexer which reduces the row input lines to the display. In this figure, the N row voltages for the display array are produced by a demultiplexer 52 that has as inputs the row driver output voltages and a separate set of control voltages produced by a control circuit 54. The demultiplexer 52 should be configured to sequentially allocate row voltages from each row driver output to multiple display inputs with the correct order and timing in response to the control voltages. As shown in FIG. 8, the display may have N rows, the row driver 24 may have n outputs, and the control circuit 54 may have p outputs. In some advantageous embodiments, the control circuit 54 is implemented as part of the row driver 24. If n+p is significantly less than N, and if the demultiplexer can be manufactured simply and inexpensively next to and/or along with the display array, cost reductions for the system as a whole will result.

Figure 9:
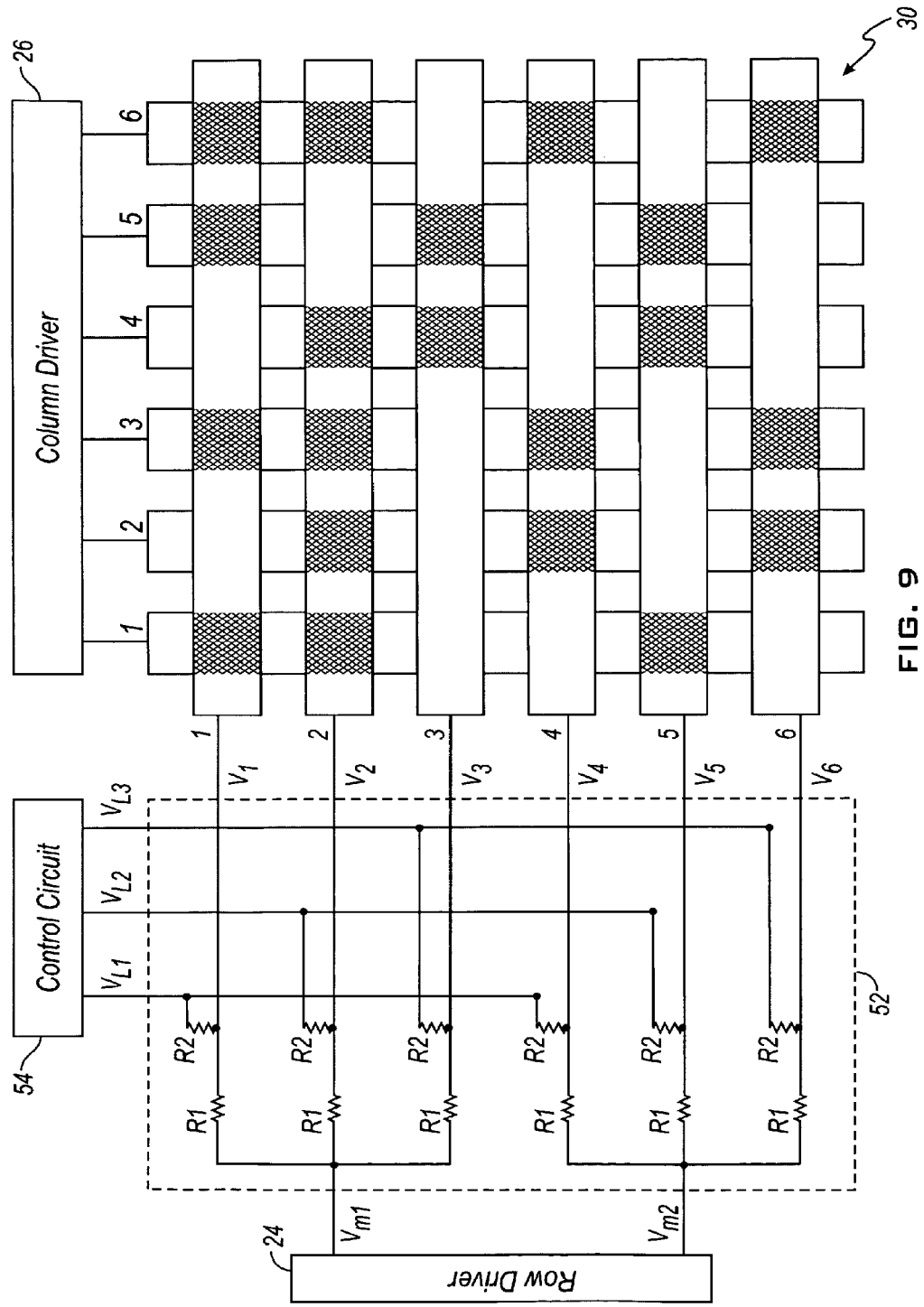
FIG. 9 is a schematic block diagram illustrating an embodiment of the demultiplexer shown in FIG. 8, which may be incorporated in a display array to reduce the row connections required.

FIG. 9 is a schematic block diagram illustrating an embodiment of the demultiplexer shown in FIG. 8, which may be incorporated in a display array to reduce the row connections required.

In the exemplary embodiment, six voltage dividers, each comprising two resistors identified as R1 and R2, are formed for the display array. Each voltage divider receives a row driver circuit output as a first input and a separate control potential as a second input and produces an output to a row of the display. The voltage dividers are divided into groups of three voltage dividers, with each row driver output connected to one group. Each control potential is connected to one and only one voltage divider within each group. The output potential that each voltage divider sends out to a given row is controlled by the row driver output potential and the control potential to which the voltage divider is coupled, and the impedance values of the two resistors. The resistances of these resistors can vary in relative value. In the exemplary embodiment, R1 is chosen to be equal to R2. Since R1 equals R2, the voltage of the output voltage will be the average of the voltage of the row driver output and the voltage of the control potential.

FIG. 10 illustrates a set of output voltages of the demultiplexer embodiment shown in FIG. 9 when an exemplary set of row driver output voltages and control voltages are applied. Each of row driver output voltages $V_{m1}$ and $V_{m2}$ and control voltages $V_{L1}$, $V_{L2}$, and $V_{L3}$ takes one of two voltages, +5 volts or −1.5 volts. Therefore, the output from each voltage divider will be one of three voltages, as illustrated in FIG. 10. Each row output from a voltage divider depends on the values of a pair of inputs, one row driver input and one control input. When a row driver output voltage and a control voltage are both +5 volts, the output to the display on the corresponding row is +5 volts. When one of the row driver output voltage and control voltage is +5 volts and the other is −1.5 volts, the output voltage to the display on that row is +1.75 volts. When both row driver output voltage and control voltage are −1.5 volts, the output voltage to the display on that row is −1.5 volts.

FIG. 11 illustrates an exemplary set of column and row voltage levels that may be used for pixels exhibiting the hysteresis curves of FIG. 3. As described above, the possible row output voltages from the voltage dividers as disclosed in FIG. 10 embodiment are +5, +1.75, and −1.5 volts. The possible column driver output voltages are +5 and −5 volts. In the FIG. 11 embodiment, in order to change the state of a given pixel, the corresponding row driver output and control voltage output for the row containing the pixel are strobed from −1.5 to +5 and back to −1.5 volts. Whether the given pixel is actuated or released depends on the column voltage. When the column voltage is −5 volts, the pixel is subject to a potential difference of 10 volts and actuated. When the column voltage is +5 volts, the pixel is subject to zero potential difference and released. For the other rows of the display with a row voltage of +1.75 or −1.5 volts, the pixels are stable in whatever state they were originally in, regardless of whether the column voltage is at +5 or −5 volts, because the applied potential difference is always within the stability window of FIG. 3.

There are many different ways to drive the display as illustrated in FIG. 9. In certain embodiments, the row by row addressing scheme is used as described above. In such a scheme, a display frame may be created by asserting the set of column electrodes in accordance with the desired set of actuated pixels in the first row. A row pulse is then applied by the driver circuit to a row connection between the driver circuit and the voltage dividers, which leads to a set of three voltage dividers including the voltage divider connected to the first row of the display array. Each voltage divider within a group that shares the same row connection is connected to a different control voltage. By carefully selecting the control voltages applied to the first row and the other two rows, only the voltage divider connected to the first row produces an output voltage that is effective to actuate or release pixels in the first row. The other two voltage dividers send out a small row pulse which does not affect the state of rows to which they are connected to. No pulse is applied to other rows of the display array. Therefore, Row 1 is updated during a line time for Row 1 while all other rows keep the current state. Row 2 then is updated during a line time for Row 2 while all other rows keep the previous state following the same approach. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present embodiment.

In an exemplary protocol, the pixel can be actuated or released only if the row output voltage to the display is +5 volts, as disclosed in FIG. 11. Therefore, to refresh a row, the row driver output voltage and the control voltage may be set to +5 volts, in order to produce a row output voltage of +5 volts to the display. To keep a row stable in the current state, at least one of the row driver output voltage and the control voltage may be −1.5 volts, therefore producing a row output voltage of +1.75 or −1.5 volts to the display.

It will be appreciated that voltages of opposite polarity than those described above can be used, e.g., actuating a pixel can involve setting the appropriate column to +5 volts, and the appropriate row to −5 volts. In that case, releasing the pixel is accomplished by setting the appropriate column to −5 volts, and the appropriate row to the same −5 volts, producing a zero volt potential difference across the pixel. In this embodiment, a row strobe of the row driver output voltage goes from +1.5 to −5, back to +1.5 volts.

Figure 12:
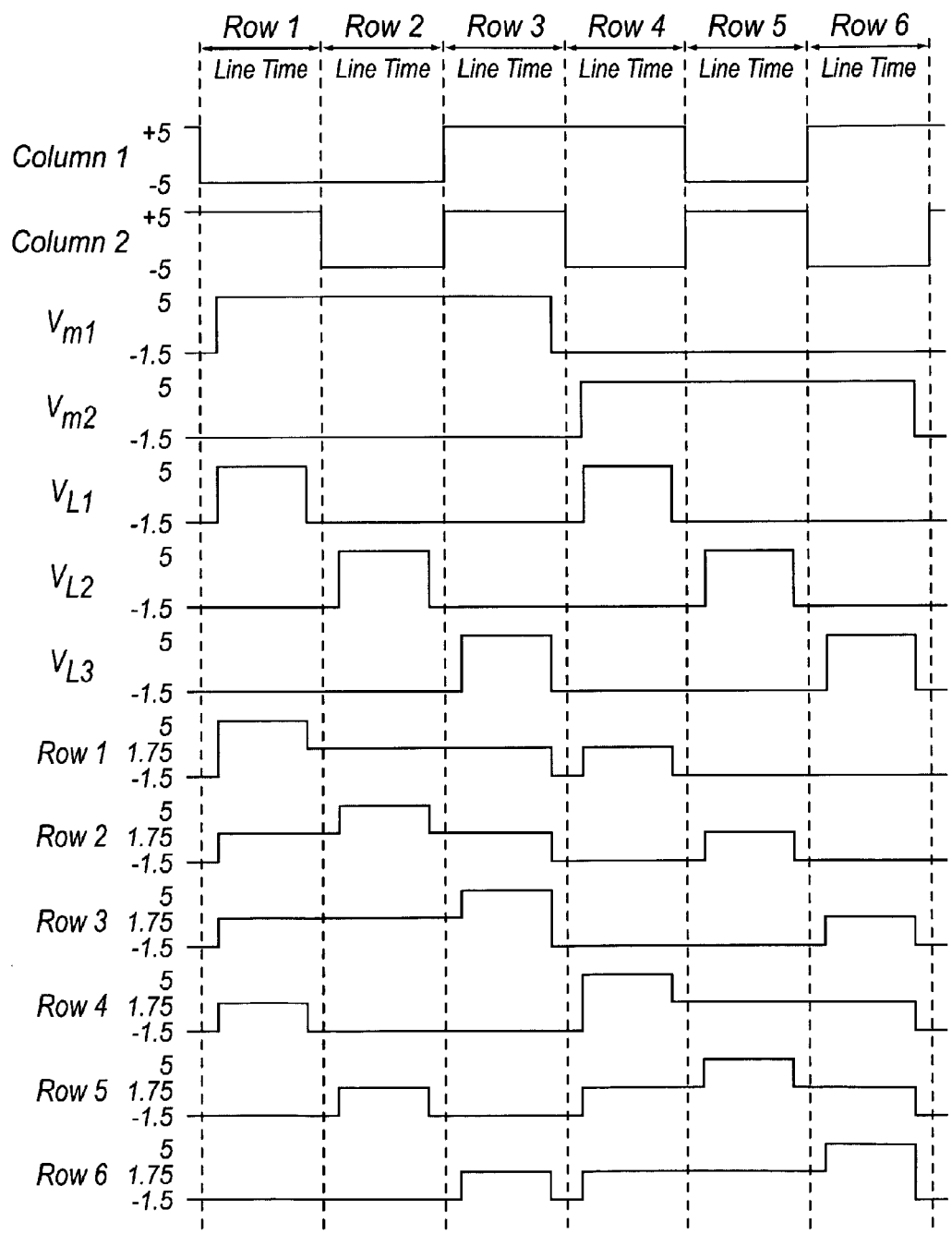
FIG. 12 is a timing diagram showing a series of column driving voltages applied to the 6×6 array of FIG. 9, and row driving voltages and control voltages applied to the voltage dividers, which will result in the display arrangement illustrated in FIG. 9.

FIG. 12 is a timing diagram showing a series of column driving voltages applied to the 6×6 array of FIG. 9, as well as row output driver voltages and control voltages applied to the voltage dividers, and which will result in the display arrangement illustrated in FIG. 9, where actuated pixels are non-reflective. The row output voltages applied by the voltage dividers to the array in response to the row output driver voltages and control voltages are also included in FIG. 9 to help illustrate the actuation protocol. To simplify the discussion, only Columns 1 and 2 are discussed here. However, it is straightforward to extend the discussion on Columns 1 and 2 to other columns.

Prior to writing the frame illustrated in FIG. 9, the pixels can be in any state, and in this example, all the row driver output voltages $V_{m1}$ and $V_{m2}$ and the control voltages $V_{L1}$, $V_{L2}$, and $V_{L3}$ are at −1.5 volts. As a result, all the rows are at −1.5 volts. All the columns are at +5 volts. With these applied voltages, all pixels are stable in their existing actuated or relaxed states, with a 6.5 volt potential difference across each pixel.

In the first two columns of the FIG. 9 frame, pixels (1,1), (2,1), (2,2), (4,2), (5,1), and (6,2) are actuated. To accomplish this, during a "line time" for Row 1, Columns 1 and 2 are set to −5 and +5 volts. This does not change the state of any pixels, because all the pixels remain in the 3-7 volt stability window. The driver circuit generates a row driver output voltage $V_{m1}$ comprising a step increase that goes from −1.5 up to +5 volts. The driver circuit also sends out a control voltage $V_{L1}$ comprising a pulse that goes from −1.5, up to +5, and back to −1.5 volts. The row driver output voltage $V_{m2}$ and control voltages $V_{L2}$ and $V_{L3}$ stay at −1.5 volts. As a result, the voltage divider connected to Row 1 sends out a pulse that goes from −1.5, up to +5, and back to +1.75 volts to Row 1. This actuates the (1,1) pixel and relaxes the (2,1) pixel. A small voltage change that goes from −1.5 up to +1.75 is applied to Rows 2-4 during the Row 1 line time. Rows 5 to 6 stay at the −1.5 volts. This does not change the states of Rows 2-6, because all the pixels remain in the 3-7 volt stability window.

To set Row 2 as desired, during a "line time" for Row 2, Columns 1 and 2 are set to −5 volts. The driver circuit sends out a row driver output voltage $V_{m1}$ which remains at +5 volts. The driver circuit also sends out a control voltage $V_{L2}$ comprising a pulse that goes from −1.5, up to +5, and back to −1.5 volts. The row driver output voltage $V_{m2}$ and control voltages $V_{L1}$ and $V_{L3}$ stay at −1.5 volts. As a result, Row 2 is strobed with a pulse that goes from +1.75, up to +5, and back to +1.75 volts. This actuates the (2,1), (2,2) pixels. A pulse that goes from −1.5, up to +1.75, and back to −1.5 volts is applied to Row 5. Rows 1 and 3 stay at the +1.75 volts, while Rows 4 and 6 stay at the −1.5 volts. This does not change the states of Rows 1 and 3-6, because all these pixels remain in the 3-7 volt stability window.

By following the approach described above, Rows 3-6 can also be properly updated to the state as shown in FIG. 9. After writing the frame, the row potentials are −1.5 volts, and the column potentials can remain at +5 volts, and the display is then stable in the arrangement of FIG. 9.

Although the exemplary embodiment has six rows, it can be extended to incorporate a display array with any number of rows while the number of control signals needed stay at three. When the number of rows in the display array is relatively large, a nearly 3 to 1 reduction in row connections between the display and the driver circuit can be realized. It will be appreciated that the 3 to 1 reduction in the exemplary embodiment can be further extended to achieve smaller or larger reductions following the same principles. For a display with N rows, one advantageous configuration is $\sqrt{N}$ control inputs and $\sqrt{N}$ row driver outputs. This minimizes the total number of control/driver lines coupled to the display circuit. For example, 1024 rows can be grouped into 32 groups of 32 rows each, and driven with a total of only 64 inputs.

Another factor to consider is power dissipation. As the voltage is modulated on control lines $V_{L1}$, $V_{L2}$, and $V_{L3}$, the groups of voltage dividers that are not active are sinking current from the control line that is at 5 volts. This can be mitigated at the expense of extra control lines by breaking the groups into sets of groups, with each set being connected to its own independent control circuit 54. Inactive sets can have all their outputs held at −1.5 volts. For example, an array with 36 rows can have 12 row driver outputs each connected to three rows through voltage divider circuits. Instead of using a single set of three control lines, two sets of three control lines may be used. The first set is connected to the top six groups of three rows, and the second set is connected to the bottom six groups of three rows. This embodiment has 12 row driver lines plus 6 control lines for a total of 18 lines for 36 rows.

Power reduction could also be achieved by including transistor or MEMS switches in series with each control line between each group. The switches between each group could be controlled in common to close after the group of rows above it has been written, and stay closed until the frame is complete.

It will also be appreciated that the timing, sequence, and levels of voltages used to perform row and column actuation can be varied widely within the general principles outlined above, and the above example is exemplary only, and any actuation voltage method can be used with the systems and methods described herein.

It will also be recognized that the circuit illustrated in FIG. 9 and configured to reduce the row connections between a driver circuit and the display can be implemented in many different ways. Although resistive voltage dividers are a simple and convenient implementation, any network of passive components that takes a plurality of inputs and provides an output that is appropriately dependent on the inputs could be utilized in accordance with the principles discussed above. Such a network may include inductors or capacitors in addition to or instead of resistors, and need not be configured strictly as a voltage divider.

Figure 13:
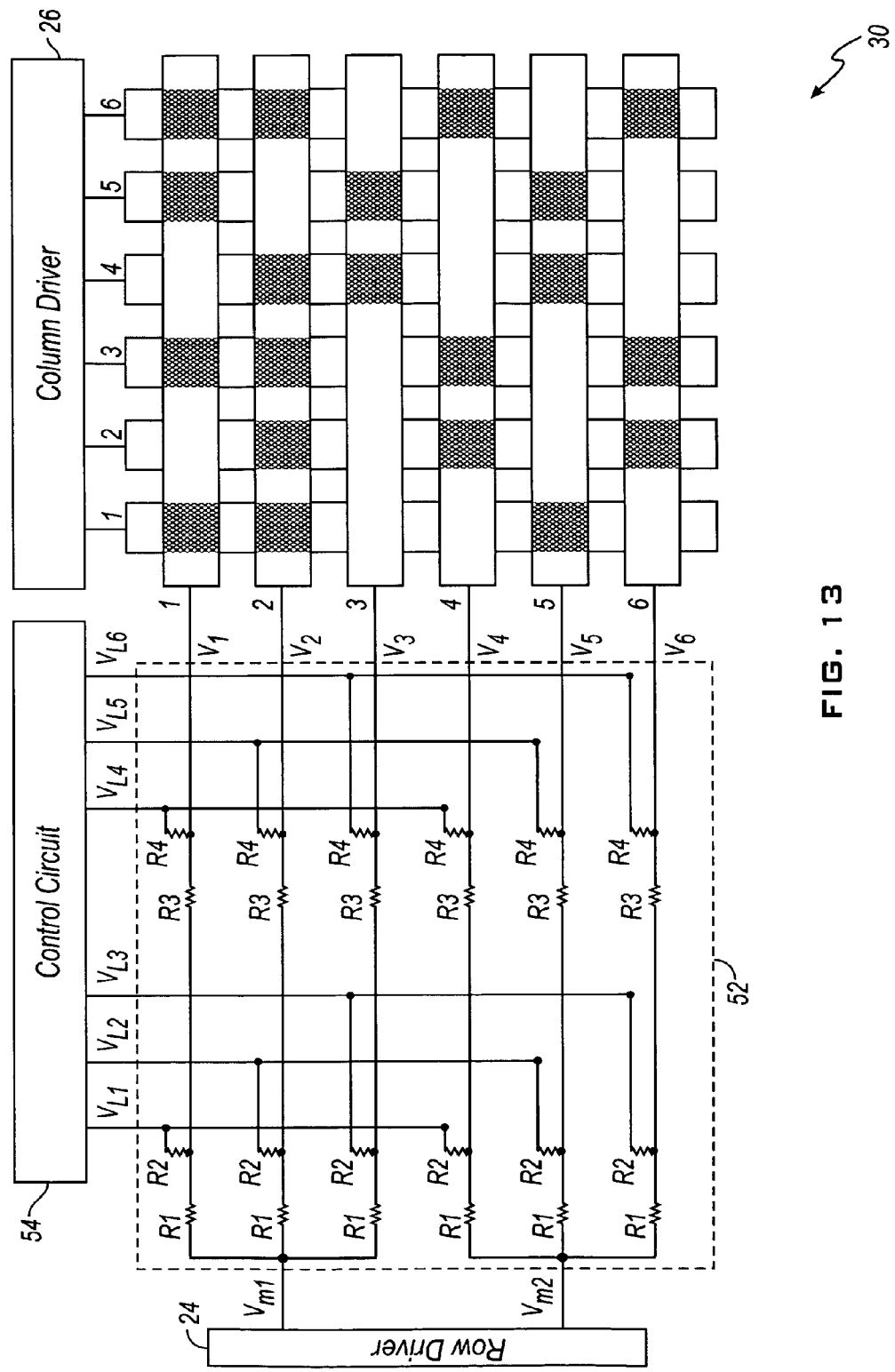
FIG. 13 is a schematic block diagram illustrating another embodiment of the demultiplexer shown in FIG. 8.

FIG. 13 is a schematic block diagram illustrating another embodiment of a demultiplexer shown in FIG. 8. In the exemplary embodiment, the circuit takes two row driver output voltages $V_{m1}$ and $V_{m2}$ and generates six output voltages to the display. Six control voltages $V_{L1}$ to $V_{L6}$ are needed instead of three control voltages as disclosed in FIG. 9 embodiment. It will be appreciated that similar schemes can be easily applied to convert each of any number of row driver output voltages into three output voltages while the number of control voltages needed stays at six. It will be also appreciated that a 1 to p conversion of input voltages to output voltages can be achieved with 2*p control voltages following similar schemes, where p is an integer larger than 1.

In the exemplary embodiment, six voltage dividers, each comprising four resistors identified as R1 to R4, are formed for the display array. Each voltage divider receives a conventional row driver output voltage and two separate control voltages and produces an output voltage to a row of the display. The voltage dividers are divided into groups of three voltage dividers, with each row driver output voltage connected to one group. Each control voltage is connected to one and only one voltage divider within each group. The output voltage that each voltage divider sends out is controlled by the row driver output voltage and the control voltages to which the voltage divider is coupled to, as well as the impedance values of the four resistors. The resistances of these resistors can vary in relative value. The main difference between the FIG. 13 embodiment and the FIG. 9 embodiment is that the FIG. 13 embodiment comprises four resistors and two control voltages for each voltage divider instead of two resistors and one control voltage as in the FIG. 9 embodiment, therefore enabling a finer control of the output voltages to the display.

FIG. 14 illustrates a set of output voltages of the demultiplexer embodiment shown in FIG. 13 when an exemplary set of row driving input voltages and control voltages are applied. In one example, each resistor is fixed to a value as illustrated in the table of FIG. 12.

In one embodiment, each of input voltages $V_{m1}$ and $V_{m2}$ can take one of two voltages, +13.5 or +1.5 volts. When the control voltages are chosen to be at particular voltages as shown in FIG. 14, the row output voltages to the display array can be at three different voltages +5, +1.75, or −1.75 volts. Following the principles discussed above in the FIG. 9 embodiment, various protocols can be developed for driving the display array as shown in FIG. 13.

Figure 15:
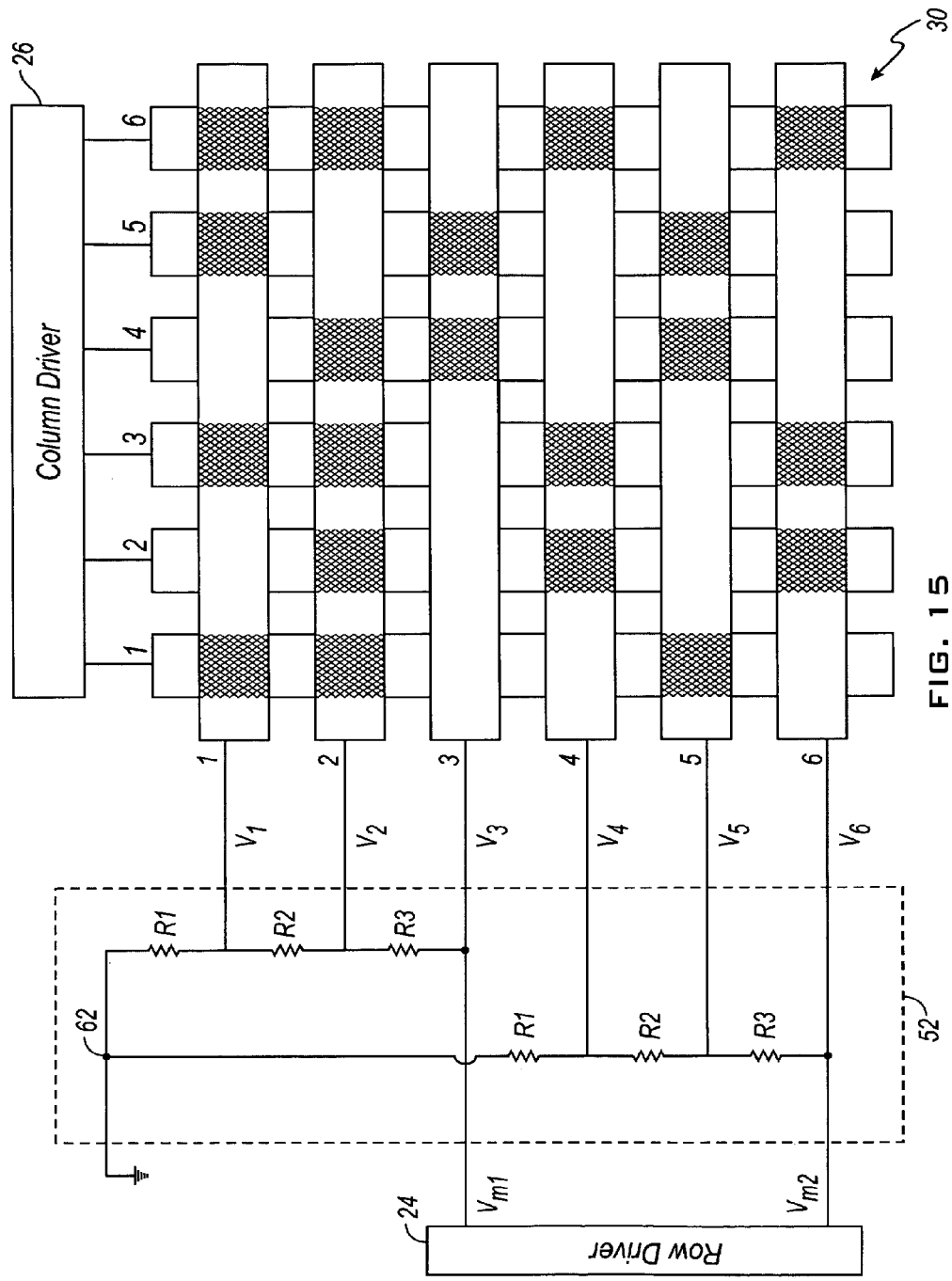
FIG. 15 is a schematic block diagram illustrating an electronic device incorporating another embodiment of a demultiplexer which reduces the row input lines to a display.

FIG. 15 is a schematic block diagram illustrating an electronic device incorporating another embodiment of a demultiplexer which reduces the row input lines to a display. In the exemplary embodiment, the circuit takes two row driver output voltages $V_{m1}$ and $V_{m2}$ and generates six output voltages to the display.

In the exemplary embodiment, one voltage divider is connected to each row driver output voltage. The voltage divider comprises a group of three resistors, identified as R1 to R3, connected in series with one end coupled to the row driver output voltage and the other end coupled to a control voltage terminal 62 to which a control voltage is applied. In one embodiment, all voltage dividers are connected to the control voltage terminal 62 and therefore subject to the same control voltage.

In certain embodiments, the control voltage may be a voltage of a constant value. For example, the control voltage terminal 62 in FIG. 15 is connected to ground. In one embodiment, the control voltage is set to a voltage of a constant value equal to the voltage level at the output of a row driver lead when the row driver 24 is between row strobes.

The voltage divider receives the row driver output voltage and the control voltage and produces three output voltages, each of which is applied to drive one row of the display, as illustrated in FIG. 15. In the exemplary embodiment, one of the row driver outputs is connected directly to the original row driver.

The three output voltages of each voltage divider are controlled by the row driver output voltage, the control voltage, and the impedance values of the three resistors. The resistances of these resistors can vary in relative value. In the exemplary embodiment, these three resistors have the same impedance value. However, they may have different values in other embodiments. Furthermore, it will be appreciated that row groupings having either two or more than three resistors could be utilized in alternative embodiments.

Figure 16:
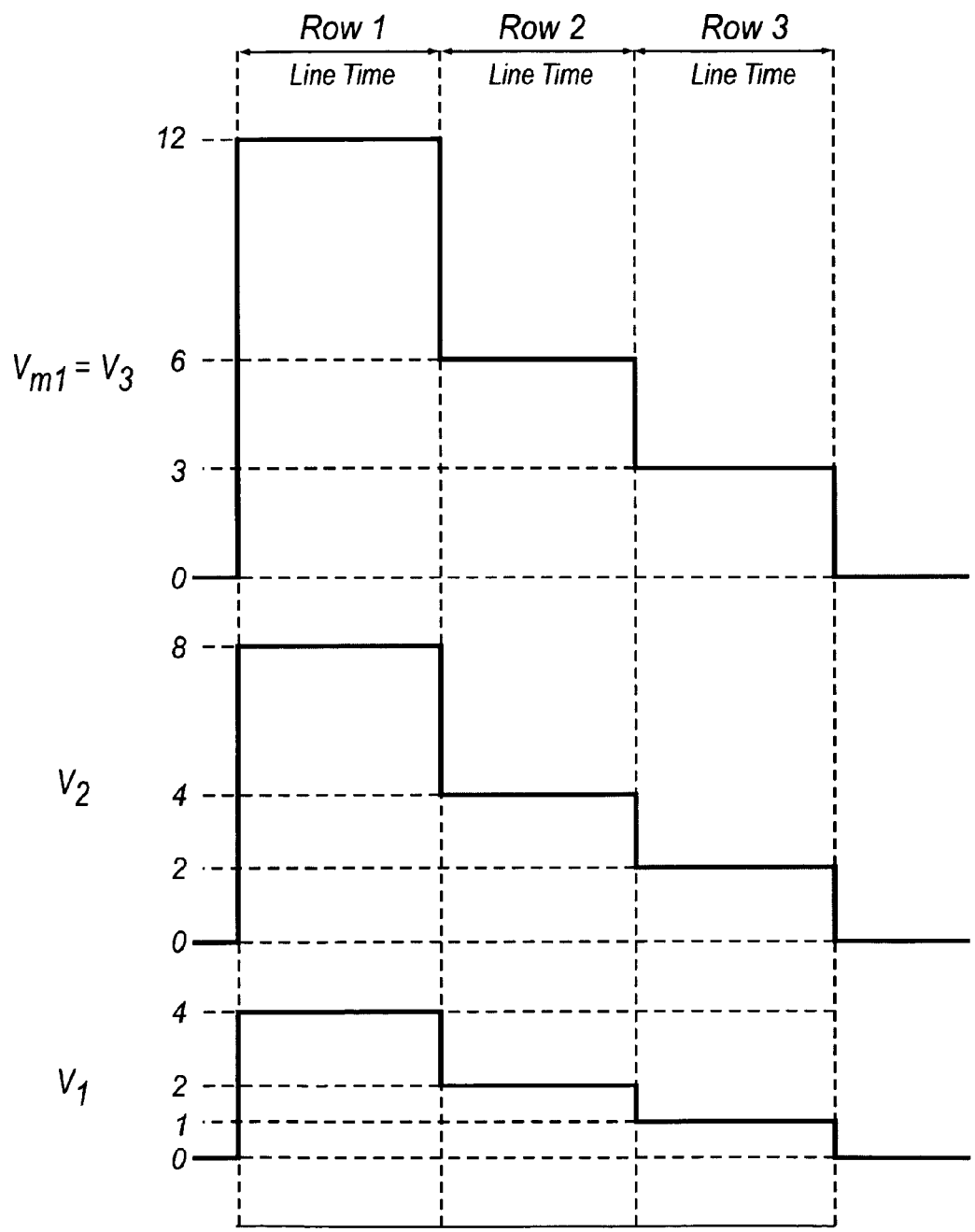
FIG. 16 is a timing diagram illustrating an example of a row output driver voltage for driving the device in FIG. 15.

FIG. 16 is a timing diagram illustrating an example of a row output driver voltage for driving the device in FIG. 15. To simplify the discussion, only Rows 1-3 are discussed here. But it is straightforward to extend the discussion to any additional rows. In the exemplary embodiment, each display pixel has the hysteresis characteristics of FIG. 3, wherein each pixel has a 3-7 volt stability window. For display pixels having different hysteresis characteristics, the row output driver voltage may be easily adjusted to driver the device properly following the disclosure here.

In the exemplary embodiment, each column is set to either +5 volts to actuate a pixel or −5 volts to release a pixel. At the beginning of a "line time" for Row 1, the row driver output voltage $V_{m1}$ is at 0 volts (as is the output at $V_{m2}$ and the rest of the row driver outputs). As a result, Rows 1-3 are all at 0 volts. With these applied voltages, all pixels are stable in their existing actuated or relaxed states, with a 5 volt potential difference across each pixel.

During line time for Row 1, the row driver output voltage $V_{m1}$ comprise a step increase that goes from 0 up to +12 volts. In response, if the resistor values are equal, the voltage at Row 1 comprises a step increase that goes from 0 up to +4 volts. Therefore, pixels in Row 1 with a column voltage at −5 volts are subject to a 9 volt potential difference and get actuated, while pixels in Row 1 with a column voltage at +5 volts are subject to a 1 volt potential difference and get released. All pixels in Row 1 are thus updated in accordance with the data. During this Row 1 line time, the pixels in Row 2 and Row 3 will be affected by the 12 volt $V_{m1}$ input, but as discussed below, what happens to these rows during the Row 1 line time will be overwritten appropriately later.

During line time for Row 2, the row driver output voltage $V_{m1}$ goes to +6 volts, and the data presented at the columns is updated to the Row 2 data after this drop in $V_{m1}$ from +12 to +6. It then follows that the voltages at Row 1 and Row 2 go to +2 volts and +4 volts respectively. Therefore, pixels in Row 2 are updated as expected similar to the discussion above. Pixels in Row 1 do not change the state because they remain in the 3-7 volt stability window regardless of the data presented to the columns. As with the Row 1 line time, pixels in Row 3 may be affected during the Row 2 line time, but will be overwritten during the Row 3 line time described below.

During line time for Row 3, the row driver output voltage $V_{m1}$ goes to +3 volts. It then follows that the voltage at Row 1, Row 2, and Row 3 goes to +1, +2, and +3 volts respectively. Pixels in Row 3 are subject to a potential difference of either 8 volts or 2 volts and therefore updated as expected. Pixels in Row 2 and Row 1 do not change the state because they remain in the 3-7 volt stability window.

By following the approach described above, Rows 4-6 can also be properly updated with the same 3 level row strobe previously used for Rows 1, 2, and 3. After writing the frame, the row potentials are 0 volts, and the column potentials can remain at +5 volts or −5 volts, and the display is stable in the previous status. It will be appreciated that the same procedure can be employed for arrays of dozens or hundreds of rows and columns. It will be appreciated that the same procedure can be employed to realize a larger or smaller reduction of the number of row connections between the driver circuit and the embodiment of a display as illustrated in FIG. 15. It will also be appreciated that the timing, sequence, and levels of voltages used to perform row and column actuation can be varied widely within the general principles outlined above, and the above example is exemplary only, and any actuation voltage method can be used with the systems and methods described herein.

It should be noted also that the passive impedance components and networks which form part of the row demultiplexing circuitry of the invention need not have fixed values. In addition, the demultiplexing circuitry need not be totally devoid of active components such as transistors or other types of switches. Although not necessary in many advantageous embodiments, switches may be useful to switch in appropriate impedances at the appropriate times. It may also be advantageous to have resistors of controllable values. This could be accomplished with local resistive heating circuits that could be controlled to raise the resistance of appropriate resistors in the circuits at appropriate times to more closely match the ideal drive and hold voltages for the pixels during the writing process. These embodiments will suffer drawbacks in increased complexity and cost, but may be useful in some instances.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of making a display device, the method comprising:
   forming an array of microelectromechanical system (MEMS) display elements comprising a plurality of columns and rows of display elements; and
   forming a demultiplexer comprising a plurality of passive impedance network circuits coupled to said array and configured to provide row output signals to drive said array, each passive impedance network comprising:
      a row driving input line to which one of a plurality of row driving signals is applied,
      at least one control input line; and
      two or more row output lines, wherein each row output line is connected to a row of said array for providing a row output signal,
   wherein the plurality of passive impedance network circuits have more outputs than inputs and provides a single row output signal for each row of said array, wherein each passive impedance network circuit comprises a voltage divider, wherein each passive impedance network is connected to a different one of the plurality of row driving signals.

2. The method of claim 1, wherein each voltage divider comprises:
   a first terminal to which one of the row driving signals is applied;
   a second terminal to which a control voltage signal is applied;
   a third terminal coupled to a row of said array and configured to provide said row output signal to drive said row;
   a first resistor between the first terminal and the third terminal, and
   a second resistor between the second terminal and the third terminal,
   wherein the first resistor and the second resistor are connected in series.

3. The method of claim 2, wherein the control voltage signal is a voltage of a constant value.

4. The method of claim 1, wherein each passive impedance network circuit comprises a resistor network.

5. The method of claim 1, wherein all voltage dividers are divided into groups of N voltage dividers and one input of all voltage dividers of each group is connected to the same row driving signal, wherein N is an integer larger than 1.

6. The method of claim 5, wherein there are totally at least N control voltage signals and each control voltage signal is applied to one and only one voltage divider within each of substantially all groups.

7. The method of claim 1, wherein said voltage dividers are fabricated in parallel with the process used to fabricate said array.

8. The method of claim 1, wherein said voltage dividers are formed on the periphery of said array.

9. The method of claim 1, wherein the steps of forming said array and forming said plurality of passive impedance network circuits are performed using the same material.

10. A method of making a display device, the method comprising:
    forming an array of microelectromechanical system (MEMS) display elements on a substrate as a set of intersecting rows and columns; and
    forming a plurality of passive impedance network circuits on the same or a different substrate, the passive impedance network circuits being configured to provide row output signals to drive the array based on a plurality of row driving signals and a plurality of control voltage signals, the number of the row output signals is larger than the sum of the number of the row driving signals and the number of control voltage signals, each passive impedance network comprising:
       a first input lead to which one of the row driving signals is applied,
       a second input lead to which one of the control voltage signals is applied, and
       an output lead connected to a row of said array and configured to provide a row output signal to drive the row,
    wherein each row driving signal is applied to at least two passive impedance network circuits, wherein each passive impedance network circuit is connected to a different row of said array, wherein no passive impedance network circuit shares the same row driving signal and the control voltage signal with another passive impedance network circuit.

11. The method of claim 10, wherein each control voltage signal is applied to at least two passive impedance network circuits.

12. The method of claim 10, wherein each passive impedance network circuit comprises a resistor network.

13. The method of claim 10, wherein each passive impedance network circuit comprises a voltage divider.

14. The method of claim 10, wherein each passive impedance network circuit further comprises:
    a first resistor between the first input and the output lead, and
    a second resistor between the second input and the output lead,
    wherein the first resistor and the second resistor are connected in series.

15. The method of claim 10, wherein the steps of forming said array and forming said plurality of passive impedance network circuits comprise performing at least some common processing steps.

16. The method of claim 10, wherein the steps of forming said array and forming said plurality of passive impedance network circuits are performed in parallel.

17. The method of claim 10, wherein the steps of forming said array and forming said plurality of passive impedance network circuits are performed using the same material.

18. The method of claim 10, wherein said array and said passive impedance network circuits are formed on a common substrate.

19. The method of claim 10, wherein said passive impedance network circuits are formed on the periphery of said array.

* * * * *